Figure 4:
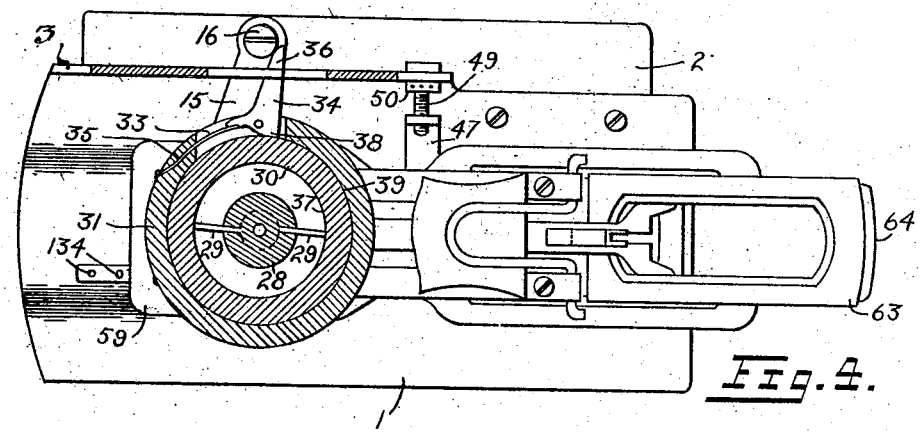

July 29, 1924.
A. B. MATTINGLY
ATTACHMENT FOR SEWING MACHINES
Filed Dec. 20, 1919
1,502,998
6 Sheets-Sheet 1
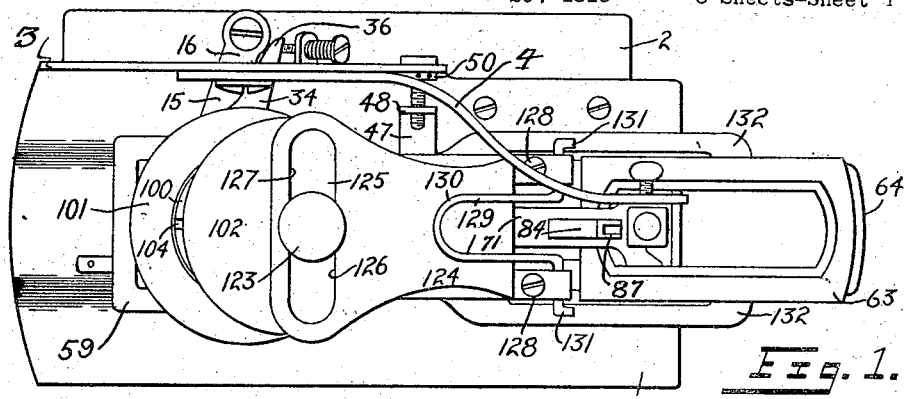
Fig. 1.
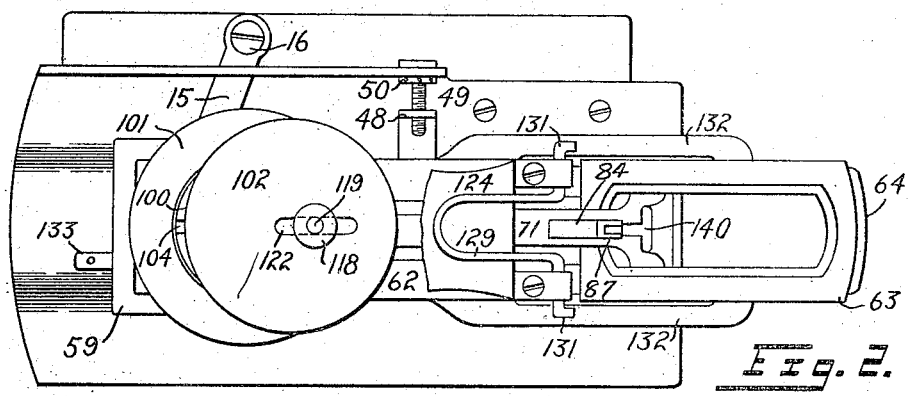
Fig. 2.
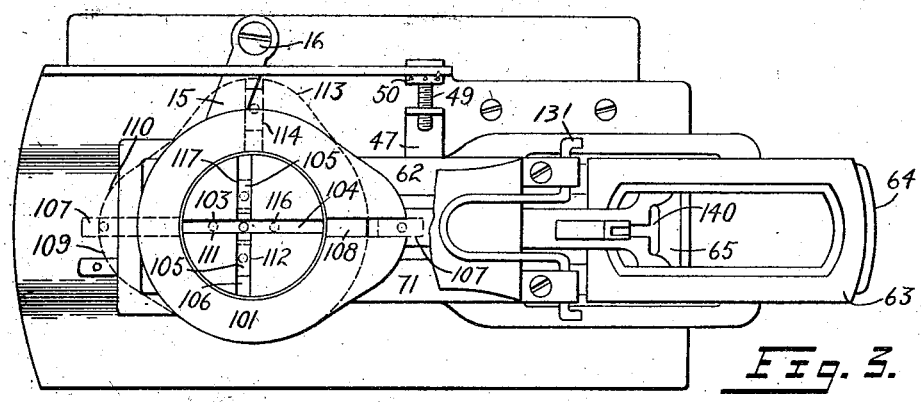
Fig. 3.
Fig. 3a.
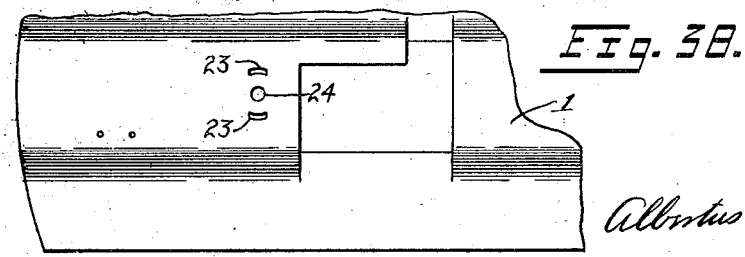
Inventor:
Albertus B Mattingly July 29, 1924.

A. B. MATTINGLY 1,502,998

ATTACHMENT FOR SEWING MACHINES

Filed Dec. 20, 1919 6 Sheets-Sheet 2

Inventor.
Albertus B Mattingly

July 29, 1924.

A. B. MATTINGLY

ATTACHMENT FOR SEWING MACHINES

Filed Dec. 20, 1919

1,502,998

6 Sheets-Sheet 3

Inventor:
Albertus B. Mattingly

July 29, 1924.
A. B. MATTINGLY
ATTACHMENT FOR SEWING MACHINES
Filed Dec. 20, 1919    6 Sheets-Sheet 4
1,502,998
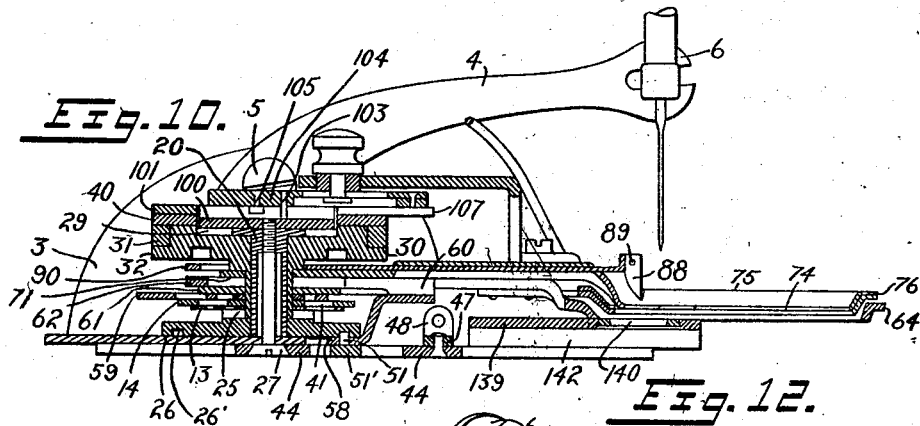
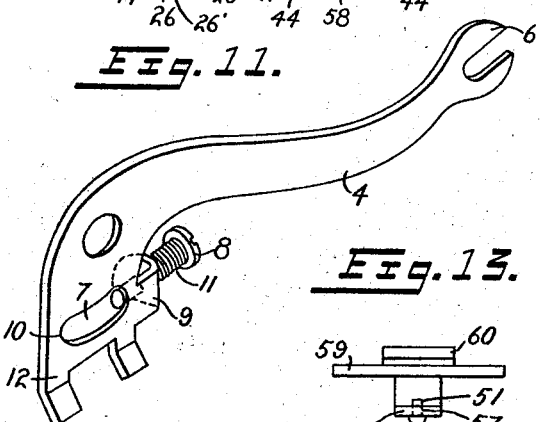
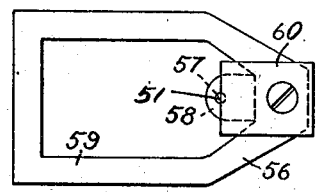
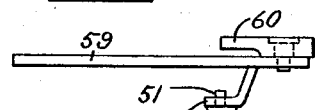
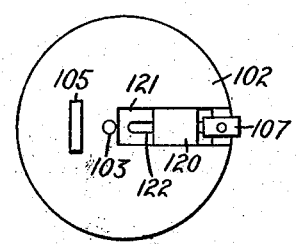
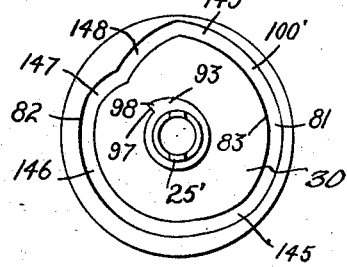
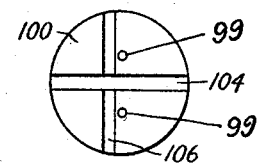
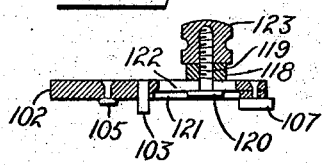
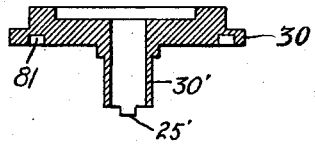
Inventor:
Albertus B. Mattingly

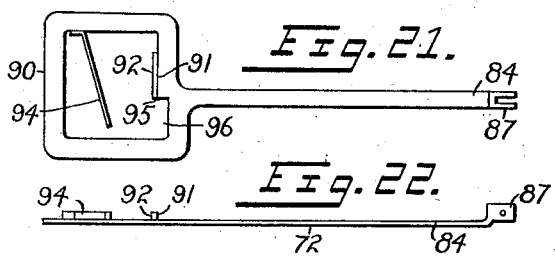
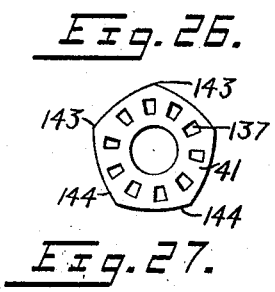
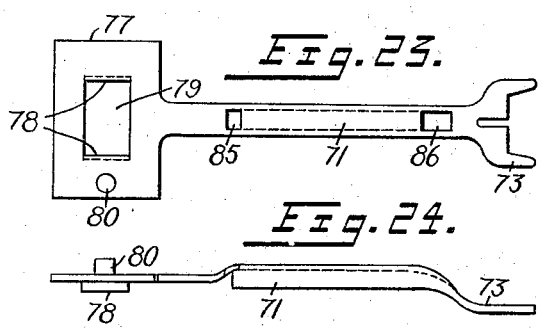
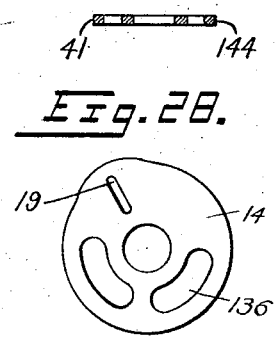
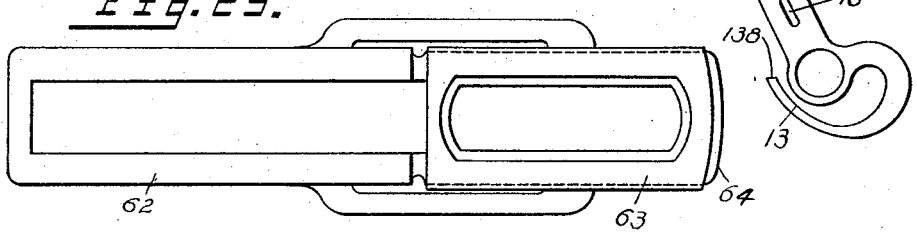
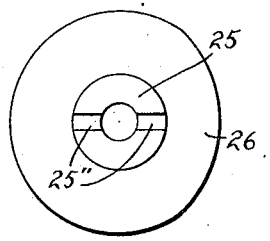
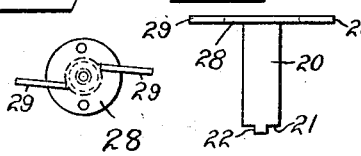
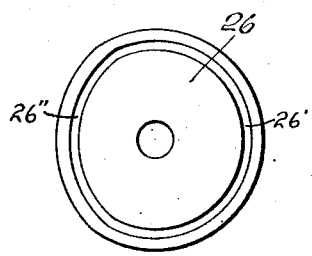
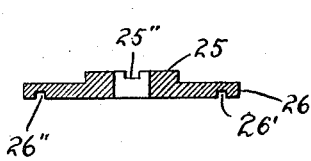
Inventor:
Albertus B. Mattingly.

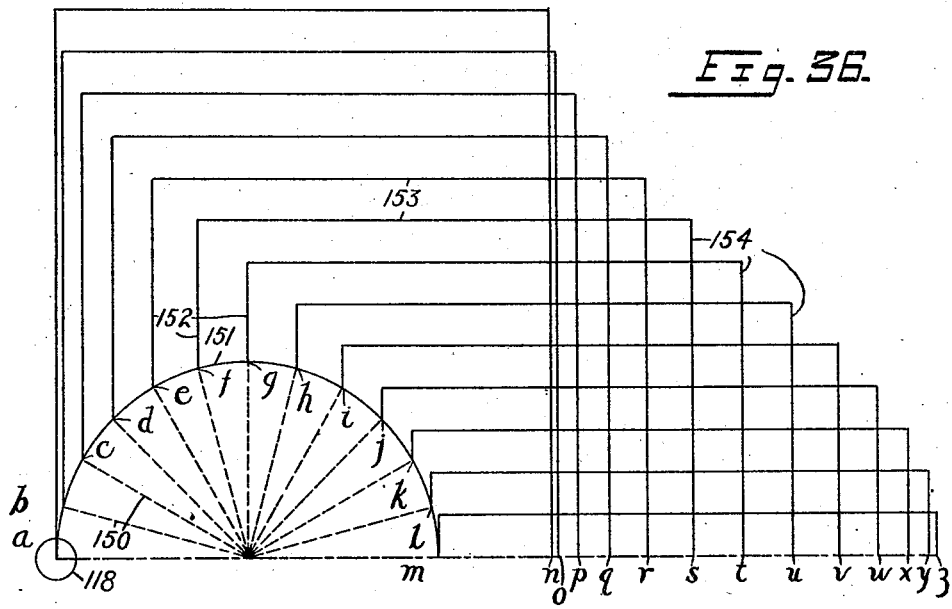
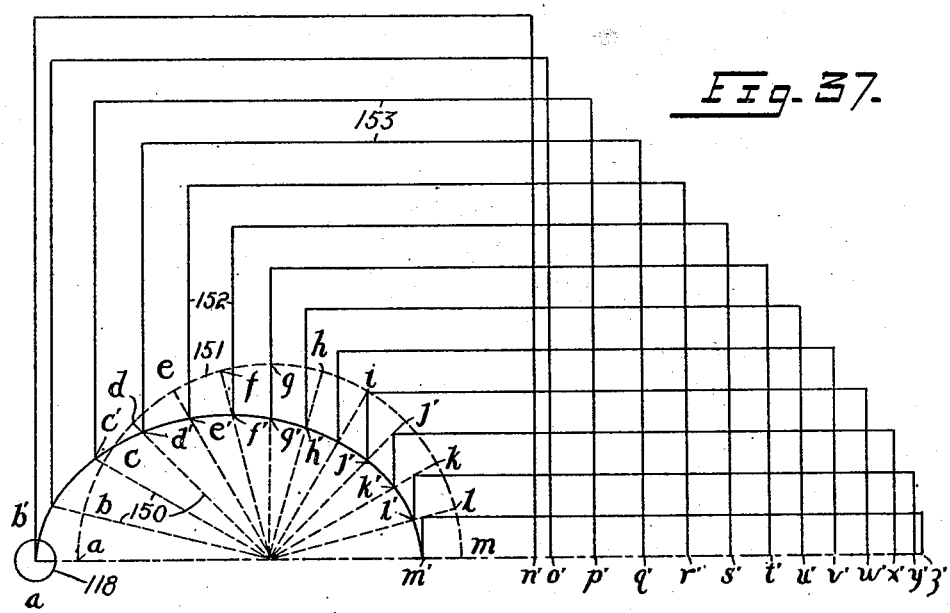

Patented July 29, 1924.

1,502,998

UNITED STATES PATENT OFFICE.

ALBERTUS B. MATTINGLY, OF NEW YORK, N. Y.

ATTACHMENT FOR SEWING MACHINES.

Application filed December 20, 1919. Serial No. 346,235.

*To all whom it may concern:*

Be it known that I, ALBERTUS B. MATTINGLY, a citizen of the United States, and resident of New York, in the county of New York and State of New York, have invented certain new and useful Improvements in Attachments for Sewing Machines, of which the following is a specification.

This invention relates to an improvement in attachments for sewing machines, and the inventor is aware that the device is of a nature similar to that disclosed in British Letters Patent No. 17,153 of 1905, to Hills, and United States Patents No. 412,081, to Fletcher, No. 446,736, to Fletcher, No. 990,601, to Seward, and No. 990,610, to Turck. and the object is to overcome some of the objectionable features of these devices and to further improve the same.

The principal objects are to provide a device of this character to automatically cut or slit the cloth just in advance of the stitching or binding of the button-hole so that the needle may pass alternately through the cloth and then through the slit or cut, thus causing the thread to be brought through the cut and make a perfect binding of the raw edges of the work and to have the work so manipulated under the needle that it will be passed in a vibratory movement around the contour of an eyelet or looped end button-hole and while passing around the curve which makes the eyelet or loop the length of the throw of the vibratory movement will be variably and evenly increased and diminished and the tension of the sewing machine will cause the cloth to be drawn or gathered in under binding stitches as the needle passes through the cloth and slot alternately and cause an open eyelet to be made; and to provide a means for positively actuating the knife with a quick and decisive action at the proper periods to make the cut the proper length according to the length of the button-holes, and to have the length of cut automatically adjust itself with the adjusting of the device for the length of the button-hole.

The further objects are to provide a device of this character which will provide a means for more evenly distributing the stitches around the contour of the button-hole than has heretofore been accomplished, and to provide a means whereby a more perfect adjustment of the cutting device as regards its alinement relative to the needle of the sewing machine is obtained.

The still further objects are to provide a device of this character which by its construction is considerably reduced in height and thereby doing away with the necessity of removing the face plate of the sewing machine to adjust the presser bar, and by the construction of the base plate obviating the necessity of removing the feed dogs of the sewing machine.

The still further objects are to provide an improved ratchet device for effecting the lateral vibration of the work clamp, to produce the overstitch of the edge of the button-hole, and to form other parts of the device by the stamping process, screw machines, which is the cheapest method of manufacturing devices of this class.

A still further object is to provide a device of this kind in which the knife can be adjusted to cut a line or slit in which the needle will follow with its inside lines of its vibrating motion on its forward movement and draw the stitches with more force at the forward end of the button-hole and cause the end to become an open eyelet, and also perform the same function on its backward movement in forming or stitching the button-hole.

With these and other objects in view, it will be seen that I accomplish the foregoing, by referring to the accompanying drawings forming a part of this specification; but I do not wish to confine myself to the exact construction shown, as I have, for the sake of clear illustration, exaggerated some of the parts, especially in the side elevations, and the cam faces of the yoke upon which the eccentric cam works.

Figure 5:
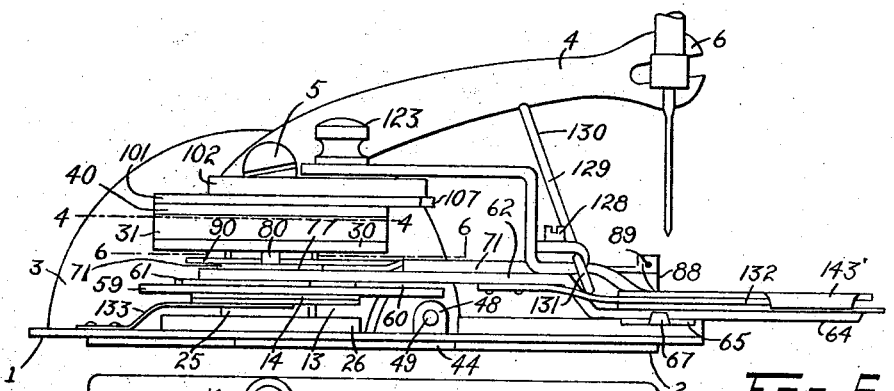
Figure 6:
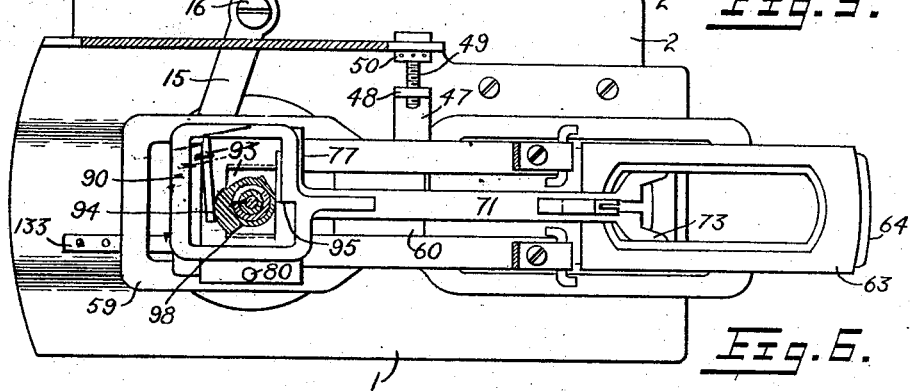
Figure 39:
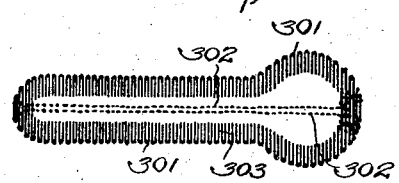
Figure 7:
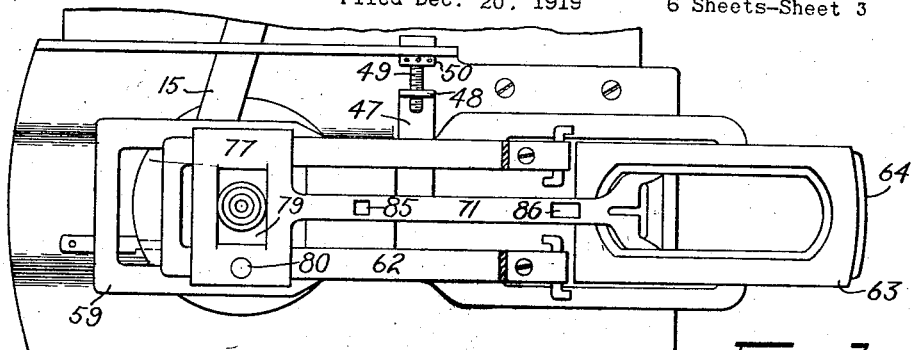
Figure 8:
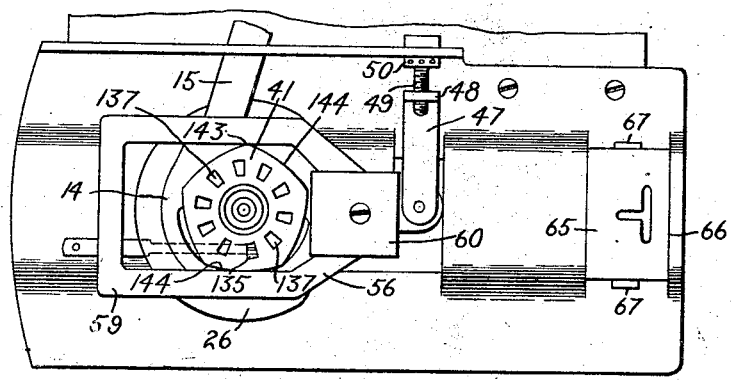
Figure 9:
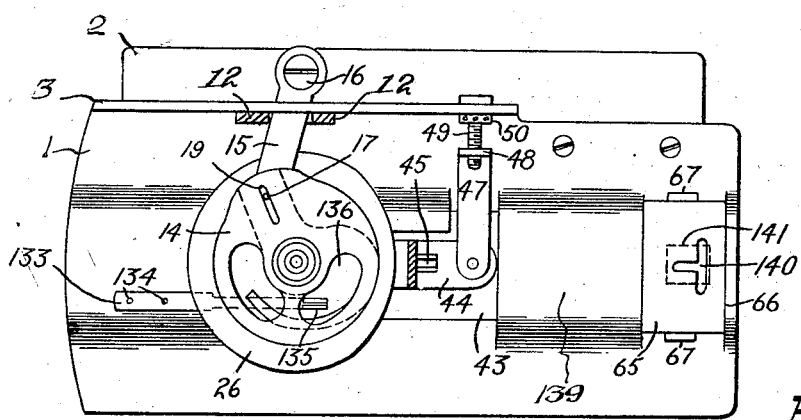
Figure 35:
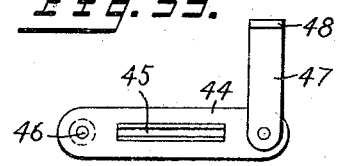

In the accompanying drawings, showing one embodiment of my invention, Figure 1 is a plan view of the device; Fig. 2 is a similar view to Fig. 1, partly broken away to show the revolving disk and the cam for moving the work clamp; Fig. 3 is a similar view to Fig. 2 with the revolving disk removed; Fig. 4 is a similar view to Fig. 3 and a section taken on line 4—4 of Fig. 5; Fig. 5 is a side elevation; Fig. 6 is a sectional view taken on the line 6—6 of Fig. 5; Fig. 7 is a similar view to Fig. 6, with the knife and its operating means removed; Fig. 8 is a similar view to Fig. 7, with the work clamp removed showing the vibrating means; Fig. 9 is a similar view to Fig. 8, with the vibrating means removed; Fig. 10 is a central vertical sectional view; Fig. 11 is a perspective view of the operating lever; Fig. 12 is a detail plan of the vibrator; Fig. 13 is an end elevation of the vibrator; Fig. 14 is a side elevation of the vibrator; Fig. 15 is a bottom plan of the revolving disk; Fig. 16 is a central section of the revolving disk; Fig. 17 is a bottom plan of the cam member showing the cam for operating the knife and the race cam for controlling the work clamp; Fig. 18 is a central section of the cam member shown in Fig. 17; Fig. 19 is a plan of the camming plate; Fig. 20 is a side elevation of the camming plate; Fig. 21 is a plan of the knife carrier; Fig. 22 is a side elevation of the knife carrier; Fig. 23 is a plan of the knife shield and integral therewith the stripper plate for the needle and the guide for the work clamp; Fig. 24 is a side elevation of Fig. 23; Fig. 25 is a plan of the work clamp; Fig. 26 is a plan of the ratchet cam; Fig. 27 is a section of the ratchet cam; Fig. 28 is a plan of the pawl plate of the vibrator; Fig. 29 is a plan of the spring pawl for operating the ratchet cam; Fig. 30 is a bottom plan of the cam member showing the race cam for operating the vibrator in its forward and back movement and for controlling the throw of the work clamp; Fig. 31 is a top plan of the cam member shown in Fig. 30 and showing the connecting means which connects it to the cam member shown in Figs. 17 and 18; Fig. 32 is a central section of the cam member shown in Figs. 30 and 31; Fig. 33 is a plan of the assembling stud carrying the brake springs; Fig. 34 is a side elevation of Fig. 33; Fig. 35 is a plan of the linkage for alining the work clamp and knife with the needle; Fig. 36 is a diagrammatic view showing the movement of the work clamp and cam when the operating cam moves in a circular motion; Fig. 37 is a view similar to Fig. 36, but showing the cam moving in an elliptical path; Fig. 38 is a fragmental view of a portion of the base plate showing the means for holding the locking stud in position; Fig. 39 is a diagrammatic view of the button-hole on an enlarged scale.

I provide a suitable base plate 1, which is secured to a rear throat plate 2 of the sewing machine in any suitable manner, but preferably screwed thereto, as shown in Fig. 1 of the drawings.

The base plate 1 is provided with an ear 3, which is upwardly turned and carries the operating lever 4, which rocks on a pivot 5 formed of a large screw, the lever 4 being provided with a bifurcated end 6, which engages the shank of the screw of the tightening collar of the needle bar of the sewing machine. The lever 4 is further provided with an arc-shaped slot 7, through which passes the arm of the friction clutch, which receives its movement from the screw 8 in the ear 9 and the rear end 10 of the slot 7. The screw 8 is frictionally held from turning by the pressure of the spring 11 against its head and the ear 9. The lever 4 is further provided with an arm or downward extension which has a bifurcated end 12 which operates the pawl 13 and the pawl plate 14 by the lever 15, which is mounted on the throat plate 2 by means of a body screw forming a pivot 16. In the forward end of the lever 15 is a pin 17 (see Figs. 9, 28 and 29) which operates the pawl 13 and the pawl plate 14 through the slots 18 and 19.

The base plate 1 is further provided with a pivot or locking stud 20, which is so formed as to have a base 21 which rests on the base plate 1 and two projecting members 22 which pass into the holes 23 (see Fig. 38) to prevent it from turning when the springs 29 of the head 28 are acting as brakes on the cam member 30. The screw 27 passing through the hole 24 and the hollow part of the stud locks all of the several parts assembled on the stud in position by its head 28, in which are secured two springs 29 which act as friction brakes in connection with the cam member 30, which is driven by a friction device (see Figs. 4 and 10) composed of a friction ring 31 supported by a flange 32 on the cam member 30; in the recess 33 of the ring is pivoted a friction dog 34, which is normally held in contact with cam member 30 by a spring 35. The lever 36 of the dog passes through an opening or slot 7 in the operating lever 4 and is operated by the screw and the rear end of the slot 7, the screw 8 forcing the dog and ring backwards and relieving the pressure on the cam member. The springs 29 bearing against the surface 37 prevent the cam member from turning, and the rear end of the slot forces the dog forward and causes the nose 38 to bite or grip the surface 39 of the cam member 30 and revolve the same a predetermined amount, which is regulated by the screw 8. The plate 40 secured to the top of cam member 30 keeps the ring in position.

Rotatably mounted upon the stud 20 and supported by the hub 25 of the cam member 26 are the pawl 13 and the pawl plate 14 (which are swung in an arc by the end 12 of the lever 4 through the lever 15 and its pin 17, in a forward and backward movement). Rotatably mounted upon the stud 20 and resting upon the pawl plate 14 is a ratchet cam 41, which operates the vibrator 56, which has its support on the pawl plate and is pivoted on the pin 51, which is formed in the shape of a T with a head 51' so beveled as to fit and slide in the slot 45 of the linked member 44 located in the cut-away portion 43 of the base plate 1. The link member 44 is provided with a circular opening 46 which fits the head of the screw 27 which acts as a pivot for it.

Secured to the forward end of the linked member 44 by a pivot is a link 47 with an upturned end 48, which is tapped for the screw 49 which passes through a hole in the ear 3 and is provided with a lock nut 50. By turning the screw 49 to pull or push the link 47, the slot 45 can be made to line up perfectly with the needle and the stud 20 and held in this position by the lock nut 50. The slot 45 is for receiving the head 51' of the pin 51. The head is tapered downwardly to fit the inclined walls of the slot; this is to prevent the pin from falling out, as it is loose in the ear 58 of the vibrator 56, through which it extends and the extension enters the groove 26' in the race cam 26 which moves the pin and the vibrator back and forth as it revolves; the revolving is done by the ears 25' of the extension 30' of the cam member 30 entering the slot 25'' in the hub 25 of the cam 26, so that it will be seen that the cam 26 revolves in conjunction with the cam member 30.

The vibrator 56 is provided with a pivoted block 60 which fits the inner faces of the rear yoke 62 of the work clamp 63, which straddles the stud 20 and rests on the supporting plate 61, which, working in conjunction with the cam member 30, keeps the forward part 64 of the work clamp in proper contact with the base plate 1 and prevents the bottom stripper plate 65 from leaving the slotted way 66 in the base as it is oscillated by the work clamp in connection with the ears 67. The supporting plate 61 is held in position by resting on the vibrator.

Mounted upon the yoke 62 is the guide or shield 71 for the knife carrier 72, having its front end 73 in the form of a stripper plate which slides in a groove or space 74 formed by a plate 75, which is forced into the upper jaw 76 of the work clamp. The rear end of the shield 71 is enlarged, forming a guide 77, by means of the downwardly extending flanges 78 fitting the yoke 62, which moves back and forth relatively to the stud 20. The rectangular opening 79 is of a width equal to the diameter of the extension 30' of the cam member 30, which passes through it and prevents the shield from moving back and forth but allows its rear end to be drawn laterally of the stud 20 in both directions by the pin 80 working in the cam groove 81 formed by the cams 82 and 83 on the under side of the cam member 30 (thus causing the vibrator to vibrate or oscillate the work clamp in the contour of a button-hole while the revolving disk is moving the work clamp back and forth the length of the button-hole).

Mounted upon the guide or shield 77 is the knife carrier 72, which has its spring portion 84 passing through the openings 85 and 86 of the shield 71, which act as guides for the carrier. The spring portion 84 has its outer end bent upward, with two ears 87 forming a pair of jaws for the knife 88, which is held by a pin or screw 89. The rear end of the spring portion 84 is formed in a rectangular frame or yoke 90 having a flange 91 forming a cam face 92 against which the cam 93 fixed to the cam member 30 works, and the flexible portion 94 insures the keeping of the cam 93 and the cam face 92 always in contact. At a predetermined point the flange 91 forming the cam face 92 is cut away or ends at 95, and the yoke is so formed at this point as to have a clearance space 96 to prevent the yoke frame from hitting the cam 93 when the flexible part 94 of the yoke causes the yoke and knife to move quickly back between the strokes of the needle and thus prevent the needle bar from striking the knife several times while it is being moved back from under the needle bar. This quick movement is caused by the cam 93, which holds the knife forward for the proper time, having an abrupt drop 97, so that while it is revolving on the stud 20 the point 98 passes the point 95 on the cam 92. The point 98 is so formed as to not interfere with the point 95, and this allows the carrier 72 to move back its full stroke at this point, which is accomplished on one of the upward strokes of the needle bar.

Mounted on the top of the stud 20 and held fixedly in place by dowel pins 99 is a camming plate 100, which works in conjunction with the driving plate 101 secured to the cam member 30 and which causes the revolving disk 102 to revolve in the path of an ellipse relative to the stud 20 and having its major axis in line with the work clamp and its minor axis transverse therewith and the intersection of its axes to the rear of the stud 20. The revolving of the disk in an elliptical path is caused by its pivot pin 103 shifting its position in the slot 104 as it revolves. The shifting of the pin is caused by the pivoted cam 105 sliding in the shallow slot 106. It will be noted that the slot 104 is deeper than the slot 106; this is to prevent the pin 103 from entering the slot 106 at the critical point when the disk 102 is being driven by the driving plate 101, which is connected to the disk 102 by the pivoted cam or block 107, which is free to slide in the slot 108 of the driving plate.

The foregoing movement will be more clearly understood by referring to Fig. 3, where I have indicated by dotted lines the positions of the pivoted cams and pins and the starting position of the driving plate for each cycle. To make a button-hole, with the driving plate in the position indicated in dotted lines 109, the cam 107 will be at 110 and the pivot pin 103 at 111 and cam 105 at 112. When the driving plate reaches the position indicated at 113 the cam 107 will be at 114 and its center will represent the end of the minor radius of the ellipse and the cam 105 will be at 115 and the pivot pin 103 will be in the center of the camming plate. While the driving plate is moving to the position shown in full lines the pivot pin 103 moves along the slot 104 to 116 and the cam 105 returns to the center of the camming plate, and as the driving plate continues its circular movement to the position 109 the cam 105 moves over to 117 and back to the center of camming plate. Mounted upon the revolving disk is an adjustable cam 118 held in position by a stud 119 having a rectangular head 120 which fits the recess 121 and which guides it in its movement. The stud passes through a slot 122 and the cam into a screw cap 123, which causes the cam 118 to bind against the disk 102. This cam moves in an elliptical path, and the lengths of the axes are changed by the adjustment of the cam on the disk 102 relative to the pin 103. The cam 118 performs the function of the eccentric cam of the patents mentioned in this specification and produces a more satisfactory result.

The cam 118 moves the work clamp forward and back from the stud 20 and in line with the needle through the yoke member 124, which is secured to the work clamp and is provided with a slot 125 in which the cam 118 is located, and as the cam revolves it works against the face 126 first to drive the clamp forward and against the face 127 to draw the clamp back. The yoke member 124 is secured to the work clamp 63 by means of screws 128, and the forward end is bifurcated and bent so as to form bearings for the locking member 129, which is formed of a bent wire having a central portion 130 which acts in the capacity of a hand lever to operate the two end portions 131 which act upon the spring extensions 132 of the upper jaw 63 and which are riveted to the rear yoke 62 of the work clamp.

Mounted on the underside of the base plate 1 (see Figs. 8 and 9) is a spring member 133, which is held in position by the rivets 134 and has an upwardly extending portion 135 which extends through the opening 136 of the pawl plate 14 and into the holes 137 of the ratchet cam 41. This prevents the ratchet cam from being turned backwards by friction of the end 138 of the pawl 13 slipping out of any one of the holes 137 upon its backward movement after it has revolved the ratchet cam one-tenth of a turn which is one of the steps of the step by step rotary movements imparted to the ratchet 41 by the upturned end 138 of the pawl 13 engaging the notches 137 of the ratchet 41, the pawl 13 receives its movements through the levers 4 and 15 from the motion of the needle bar of the sewing machine.

The base plate is further bent or formed so as to have a raised portion 139 through the center thereof, upon which the bottom of the work clamp slides and on which is cut the channel or groove 66 for the stripper plate 65, which has an opening 140 somewhat in the shape of a T. Beneath the stripper plate 65 in the base plate is an opening 141 to allow the needle to perform its functions. The raised portion 139 forms a channel or groove 142 (see Fig. 10), which allows the free action of the feed dogs of the sewing machine and raises the device enough to permit the cutting of the cloth without the knife hitting the dogs on its downward stroke.

The operation of the device is very simple. The rear throat plate of the sewing machine is removed and the device is slipped in its place by the insertion of the throat plate 2 which is screwed to the device, and the shank of the screw which holds the needle in position passes into the bifurcated end 6 of the lever 4. When the attachment is first put on the machine the screw 49 and lock nut 50 are loosened and the screw 49 turned to bring the knife in line with the needle. The lock nut 50 is then tightened up. This holds the slot 45 in a perfect line with the needle and the attachment is ready for operation. It will be understood that after the knife has been once adjusted for the needle the attachment can be removed if desired and put back without the knife being readjusted, and the vibrating movement of the work clamp can be changed to take more or less bite by tightening or loosening the thread tension of the sewing machine, when the attachment is adjusted to make a larger or smaller button-hole, without disturbing the adjustment of the knife.

To make a button-hole, the work clamp is set by operating the sewing machine until the extreme back position is reached. The lever 130 of the locking member 129 is then pressed forward, (that is, in the direction of the needle), and forces the ends 131 backwards and thus relieves the pressure of the springs 132, which allows the jaws of the work clamp to open. The cloth is inserted between the jaws and the lever 130 pushed back to its original position, thus causing the upper jaw to force the cloth down into the concave opening in the lower jaw, and at the same time the flanges 143' of the upper jaw prevent the slipping of the cloth on the lower jaw and thus causes the cloth to be stretched like a drum head. With the work clamp in this position the knife is in the position shown in Fig. 5, and upon running the machine the needle bar strikes the top of the knife and forces it through the cloth each time the needle descends, until the work clamp is almost at its extreme forward position, when the cam 93 is at the point where the point or nose 98 passes the point 95, which is when the first half of the button-hole is finished. The flexible portion 94 of the yoke causes the yoke to move swiftly back and draw the knife out of line with the needle bar before it has time to descend and strike it again, (as shown in full lines in Fig. 5), thus preventing further cutting, and the knife remains in this position until the button-hole is finished.

The pivot 80' is the pivot center upon which the work clamp is oscillated by the vibrator 56. With each upward movement of the needle bar the lever 4 is raised, which in turn swings the pawl plate 14 sufficiently to have the pawl 138 act on one of the holes 137 of the ratchet cam and revolve it one-tenth of a revolution, which causes one of the pointed cam faces 143 to act on one side of the yoke 59 and cause the vibrator to swing to one side on its pivot 51. The face 144 prevents any overthrow of the vibrator. The next stroke of the needle causes one of the faces 143 to act on the opposite side of the yoke 59 and swing it in the opposite direction. This movement of the vibrator causes the work clamp to be oscillated on its pivot 80, such motion being transmitted through the block 60 of the vibrator. While the vibrator is oscillating the work clamp in one direction or the other with every stroke of the needle to make the needle pass first through the cloth and then through the cut, the elliptical cam is slowly shoving the work clamp forward the length of the button-hole, the speed of the forward movement being regulated by the screw 8, which strikes the arm or lever 36 of the friction clutch and forces the ring 31 back a predetermined amount, (upon the downward stroke of the needle). The rear end 10 of the slot 7, upon reaching the arm 36, (on the upward movement of the needle) forces the ring to move forward and the nose 38 to bite into the cam member 30 and cause it and the revolving disk to revolve, which causes the cam 118 to act upon the face 126 of the yoke member 124 and shove the work clamp forward, and when the cam, on the last half of the revolution of the revolving disk, works against the face 127 it causes the work clamp to be drawn backwards. The revolving of the cam member 30 causes the pin 80 to shift its position while the button-hole is being made. This is due to the pin 80 being held relative to the stud 20 by the groove 81 and in the start is in the portion 145 which forms a part of the back end of the button-hole, that is, the part which is furthest from the edge of the garment. The part 146 holds the pin in a position so that the vibrator will vibrate the work clamp up one side of the slit which is being made by the knife for the button-hole. The part 147 then causes the pin 80 to move nearer to the stud 20, and this causes the first part of the loop or eyelet to be made, and the part 148 causes the pin 80 to move the furthest away from the stud, and this causes the semi-circular end of the eyelet to be made. The part 149 causes the pin 80 to move near to the stud, and this causes the completion of the eyelet. The pin is then held in position by the part 100' until the vibrating of the work clamp down the other side of the slit completes the button-hole by the pin going to its original position in the portion 145. It will be understood that the cam 26 is being driven at the same speed as the cam member 30 through the ears 25' and that when the pivot 80 is entering the part 147 to start the eyelet the pivot pin 51 is entering the part 26" of the groove 26', which starts the pin 51 to move in the slot 45 towards the stud 20, and it is understood that the nearer the pin 51 is to the stud the greater the throw of the work clamp It will also be seen that the throw is gradually increased until the first half of the eyelet is made and it will be understood that as soon as the pin 51 starts to shift, the pivot 80 also starts to shift its position relative to the stud 20, and continues this movement until the pin 51 is pushed back gradually by the groove until the eyelet is finished The thread tensions of the sewing machine, being properly adjusted, draw in the excess cloth taken in by the increased throw and cause an opening in eyelet. This operation forms what is known by the trade as the eyelet or looped button-hole, and is shown in Fig. 39 in which the dotted lines 301 and 302 represent the paths which the needle makes first piercing the cloth in the path 301 and then piercing the slit cut by the knife in the path 302 the shifting of the work-clamp pivot 80 and the pivot pin 51 of the vibrator at the same time and in conjunction with each other will cause the needle to pierce the cloth after the parallel lines are finished and the eyelet is reached, and then pierce the slit and then pierce further and further from the slit with each alternate pierce until the first quarter of the eyelet is complete, and then the further movement of the pivot 80 counteracts the movement of the pin 51 and the needle pierces the cloth gradually coming nearer to the slit with each alternate pierce until the second quarter of the eyelet is finished and from this point the movements are the same but reversed in their cycle and so on until the button-hole is completed. It will be noted that the thread 303 of the needle draws and covers up by its tension the surplus cloth lying between the edges of the slit and the path 301, and thus forms an open eyelet button-hole from a straight slit made in the cloth and the surplus cloth serves to make a more perfect pearl or raised portion for the edge of the button-hole. It will be noted that the cam member 30 revolves an equal distance at each stroke of the needle, and if the cam 118 were attached directly to the cam member the cam would move in a circle and would pile up too many stitches at the end and make a defective button-hole; but by having the cam 118 move in an elliptical path this is obviated. Of course, it is desirable to have the stitches a little closer at the back end than on the side, but not to the extent which would be produced if the circular movement were used.

By referring to the diagrammatic Figs. 36 and 37, it will be seen more clearly the advantages gained by the cam 118 moving in the elliptical path instead of the circular path. In these two views I have indicated by the dotted lines 150 the movement of the cam member 30 for every ten strokes of the needle or for every ten stitches, and the point where each dotted line 150 touches the semi-circle 151 indicates where the cam 118 would be; for instance, after the first ten stitches it would have moved from $a$ to $b$ and the second ten stitches from $b$ to $c$ and so on until after a hundred and twenty stitches it would be at $m$ and the first half of the button-hole would be finished, and the reverse movement would under the same conditions, while the cam 118 is completing the circle, complete the button-hole. The vertical lines 152 represent the forward movement of the cam 118 and the horizontal lines 153 the work clamp, and the vertical lines 154 represent the forward movement of the work clamp. It will be noted that all of the lines 153 are exactly the same length in both figures, and when the cam 118 moves from $a$ to $b$ ten stitches are crowded into the space between $n$ and $o$, and when it moves from $b$ to $c$ ten are made in the space from $o$ to $p$, and so on, and as the cam 118 moves from $a$ to $g$ each of the spaces 155 from $n$ to $t$ increases in length and thus it will be seen that entirely too many stitches are crowded into the space from $n$ to $o$ and $o$ to $p$, while from $p$ to $q$ the stitches would be normal and $q$ to $r$ would not have sufficient stitches, and $r$ to $s$ and $s$ to $t$ entirely too few, and the exact reverse condition would exist while the cam 118 is moving from $g$ to $m$ and the clamp from $t$ to $z$. Thus it will be seen that the circular movement gives a very uneven stitching of the button-hole, by piling up too many stitches at the back end and entirely too few at the eyelet end, as the distance of travel or space is greatly increased by the curvature of the eyelet. It will be noted that the work clamp needs to be retarded at the eyelet in order to allow more stitches to be made while the eyelet is being formed, and I accomplish this by having the cam 118 move in an elliptical path and by having the minor axis of the ellipse to the rear of the center of the stud 20, as will be seen by referring to Figs. 3, 19 and 37. It will be noted that the cam 118 follows an elliptical path, indicated by the line 156, and when the cam member 30 moves from $a$ to $b$ the cam moves from $a$ to $b'$, and when the cam member has moved to $c$ the cam has moved to $c'$, and so on, and the clamp has moved from $n'$ to $o'$ while the cam member has moved from $a$ to $b$ and the cam from $o$ to $b'$, and so on. It will be noted that the spaces $n'-o'$ are suitable for the back end and the space $o'-p'$ is almost normal and the spaces $p'-q'$ and $q'-r'$ are normal, and the spaces $r'-s'$ to $y'-z'$ are gradually shortened in order to compensate for the increased travel or lengthened space to be stitched while the eyelet is being formed, and the work clamp at this point is moving in a line forming a compound curve instead of a straight line, and the retarding of forward movement allows the sewing machine to supply sufficient stitches to make the eyelet have the proper number of stitches to compare with the sides of the button-hole. It is understood that the formation of the other side of the button-hole is the exact reverse of the movements shown in the diagrams and that the diagram in Fig. 37 shows the movement of the work clamp relative to the needle and the stud of the attachment, it being understood that the back end of the button-hole is the beginning of the operation and also the ending of the operation and that the back end is made while the work clamp is moving forward from $n'$ to $o'$ and the sides from $o'$ to $t'$ and the eyelet end from $t'$ to $z'$, or in other words, in the operation of making the button-hole the work on the button-hole is always in the reverse direction to the movement of the work clamp. It will be understood that I have stated for convenience of illustration that ten stitches are made between each of these divisions; but by regulating the screw 8 any number of stitches can be made between the divisions; and from the foregoing it will be clearly seen that the elliptical movement places the stitches very evenly along the sides of the button-hole and does not overcrowd the ends too much, as the space between $n'$ and $o'$ is greater than between $n$ and $o$. Certain parts of the present mechanism are not claimed herein, but are claimed in applications Serial No. 353,107; 353,108; 217,401; 218,076; 352,980; 336,256; 336,257.

What I claim is:

1. In apparatus of the character stated, the combination of a base plate having stud projection receiving holes therein, a tubular stud having projections for engaging said holes, to prevent rotary movement of the stud, said stud having a head provided with laterally disposed springs, a lower cam having a slotted hub rotatably mounted upon said stud, an upper cam having a recessed top and a depending sleeve provided with ears rotatably mounted upon said stud, the ears of said sleeve engaging with the slots of said hub and the springs of said head engaging the walls of said recessed portion and means passing through said base plate, stud and head for locking said cams in rotative relation.

2. In apparatus of the character stated, the combination of a base plate having stud projection receiving holes therein, a tubular stud having projections for engaging said holes to prevent rotary movement of said stud, said stud having a head provided with laterally disposed springs, a lower cam having a slotted hub rotatably mounted upon said stud, an upper cam having a recessed top and a depending sleeve provided with ears rotatably mounted upon said stud, the ears of the sleeve engaging with the slots of said hub and the springs of the head engaging the walls of said recessed portion, means passing through said base, stud and head for relatively locking said parts together and a pawl and pawl plate rotatably mounted upon said stud and supported by said hub.

3. In apparatus of the character stated, the combination of a base plate having stud projection receiving holes therein, a tubular stud having projections for engaging said holes to prevent rotary movement of said stud, said stud having a head provided with laterally disposed springs, a lower cam having a slotted hub rotatably mounted upon said stud, an upper cam having a recessed top and a depending sleeve provided with ears rotatably mounted upon said stud, the ears of the sleeve engaging with the slots of said hub and the springs of the head engaging the walls of said recessed portions, means passing through said base, stud and head for relatively locking said parts together, a pawl and pawl plate rotatably mounted upon said stud and supported by said hub and a ratchet cam rotatably mounted upon said stud above said pawl and pawl plate.

4. In apparatus of the character stated, the combination of a base plate having stud projection receiving holes therein, a tubular stud having projections for engaging said holes to prevent rotary movement of said stud, said stud having a head provided with laterally disposed springs, a lower cam having a slotted hub rotatably mounted upon said stud, an upper cam having a recessed top and a depending sleeve provided with ears rotatably mounted upon said stud, the ears of the sleeve engaging with the slots of said hub and the springs of the head engaging the walls of said recessed portions, means passing through said base, stud and head for relatively locking said parts together, a pawl and pawl plate rotatably mounted upon said stud and supported by said hub, a ratchet cam rotatably mounted upon said stud above said pawl and pawl plate and a vibrator connected with said ratchet cam.

5. In apparatus of the character stated, the combination of a base plate having stud projection receiving holes therein, a tubular stud having projections for engaging said holes to prevent rotary movement of said stud, said stud having a head provided with laterally disposed springs, a lower cam having a slotted hub rotatably mounted upon said stud, an upper cam having a recessed top and a depending sleeve provided with ears rotatably mounted upon said stud, the ears of the sleeve engaging with the slots of said hub and the springs of the head engaging the walls of said recessed portions, means passing through said base, stud and head for relatively locking said parts together, a pawl and pawl plate rotatably mounted upon said stud and supported by said hub, a ratchet cam rotatably mounted upon said stud above said pawl and pawl plate, a vibrator connected with said ratchet cam, a work clamp having a rear yoke and a block pivoted to the vibrator and fitting within said yoke.

6. In apparatus of the character stated, the combination of a base plate having stud projection receiving holes therein, a tubular stud having projections for engaging said holes to prevent rotary movement of said stud, said stud having a head provided with laterally disposed springs, a lower cam having a slotted hub rotatably mounted upon said stud, an upper cam having a recessed top and a depending sleeve provided with ears rotatably mounted upon said stud, the ears of the sleeve engaging with the slots of said hub and the springs of the head engaging the walls of said recessed portions, means passing through said base, stud and head for relatively locking said parts together, a pawl and pawl plate rotatably mounted upon said stud and supported by said hub, a ratchet cam rotatably mounted upon said stud above said pawl and pawl plate, a vibrator connected with said ratchet cam, a supporting plate, a work clamp having a rear yoke which straddles said stud, and rests upon said supporting plate and a block pivoted to said vibrator and fitting within said yoke.

7. In apparatus of the character stated, the combination of a base plate having stud projections receiving holes therein, a tubular stud having projections for engaging said holes to prevent rotary movement of said stud, said stud having a head provided with laterally disposed springs, a lower cam having a slotted hub rotatably mounted upon said stud, an upper cam having a recessed top and a depending sleeve provided with ears rotatably mounted upon said stud, the ears of the sleeve engaging with the slots of said hub and the springs of the head engaging the walls of said recessed portions, means passing through said base, stud and head for relatively locking said parts together, a pawl and pawl plate rotatably mounted upon said stud and supported by said hub, a ratchet cam rotatably mounted upon said stud above said pawl and pawl plate, a vibrator connected with said ratchet cam, a supporting plate, a work clamp having a rear yoke which straddles said stud and rests upon said supporting plate, a block pivoted to said vibrator and fitting within said yoke and a knife carrier shield mounted upon said yoke, the rear of which shield is provided with a rectangular opening which engages over the sleeve of said upper cam.

8. In an apparatus of the character set forth, the combination of a base, a work clamp, means for reciprocating the work clamp lengthwise of the button-hole, means for slitting the work in the work clamp in the forward movement of the work clamp, means for causing the work clamp to vibrate laterally to move the slit in the work toward and from the needle along one side of the slit as the work is advanced by the holder, and to cause a similar vibration of the work clamp on the return stroke on the opposite side of the slit, said means being further arranged to vary the lateral vibration of the work clamp at the advance end of the slit on each side, whereby to form an open or eyelet end of the button-hole.

9. In an apparatus of the character set forth, the combination of a base, a work clamp, means for reciprocating the work clamp lengthwise of the button-hole, means for slitting the work in the work clamp in the forward movement of the work clamp, means for causing the work clamp to vibrate laterally to move the slit in the work toward and from the needle along one side of the slit as the work is advanced by the holder, and to cause a similar vibration of the work clamp on the return stroke on the opposite side of the slit, said vibrating means being arranged to vary the said lateral vibration of the work clamp as the needle reaches the advance end of the stroke by first increasing the amount of the vibration and then decreasing the amount of the vibration, and on the return movement to cause the lateral vibration on the opposite side of the work slit to first increase the amount of lateral vibration to more than normal and then decrease to normal at the said end portion whereby to form an open or eyelet end of the button-hole.

10. In an apparatus of the character set forth, the combination of a base, a work clamp, means for reciprocating the work clamp lengthwise of the button-hole, means for slitting the work in the work clamp in the forward movement of the work clamp, means for causing the work clamp to vibrate laterally to move the slit in the work toward and from the needle along one side of the slit as the work is advanced by the holder, and to cause a similar vibration of the work clamp on the return stroke on the opposite side of the slit, and a cam arranged to vary the lateral vibration of the work clamp at the advance end of the slit on each side, whereby to form an open or eyelet end of the button-hole.

11. In an apparatus of the character set forth, the combination of a base, a work clamp, means for reciprocating the work clamp lengthwise of the button-hole, means for slitting the work in the work clamp in the forward movement of the work clamp, means for causing the work clamp to vibrate laterally to move the slit in the work toward and from the needle along one side of the slit as the work is advanced by the holder, and to cause a similar vibration of the work clamp on the return stroke on the opposite side of the slit, and a cam arranged to vary the said lateral vibration of the work clamp as the needle reaches the advance end of the stroke by first increasing the amount of the vibration and then decreasing the amount of the vibration, and on the return movement to cause the lateral vibration on the opposite side of the work slit to first increase the amount of lateral vibration to more than normal and then decrease to normal at the said end portion whereby to form an open or eyelet end of the button-hole.

Signed at New York in the county of New York and State of New York this 4th day of December A. D. 1919.

ALBERTUS B. MATTINGLY.